(12) United States Patent
Masten, Jr.

(10) Patent No.: US 11,827,966 B2
(45) Date of Patent: Nov. 28, 2023

(54) SHIELDING AND DIFFERENTIATING RECEIVER FOR RADIANT HEATING PROCESSES

(71) Applicant: James William Masten, Jr., Everett, WA (US)

(72) Inventor: James William Masten, Jr., Everett, WA (US)

(*) Notice: Subject to any disclaimer, the term of this patent is extended or adjusted under 35 U.S.C. 154(b) by 0 days.

(21) Appl. No.: 17/691,024

(22) Filed: Mar. 9, 2022

(65) Prior Publication Data

US 2022/0290280 A1 Sep. 15, 2022

Related U.S. Application Data

(60) Provisional application No. 63/158,742, filed on Mar. 9, 2021.

(51) Int. Cl.
| | | |
|---|---|---|
| *C22F 1/04* | (2006.01) | |
| *F27D 5/00* | (2006.01) | |
| *G01J 5/0875* | (2022.01) | |
| *F27D 11/00* | (2006.01) | |
| *G01K 1/14* | (2021.01) | |
| *H05B 3/00* | (2006.01) | |

(52) U.S. Cl.
CPC ............... *C22F 1/04* (2013.01); *F27D 5/00* (2013.01); *F27D 11/00* (2013.01); *G01J 5/0875* (2013.01); *G01K 1/14* (2013.01); *H05B 3/0061* (2013.01)

(58) Field of Classification Search
None
See application file for complete search history.

(56) References Cited

U.S. PATENT DOCUMENTS

| | | |
|---|---|---|
| 3,907,606 A | 9/1975 | Chang |
| 4,144,758 A | 3/1979 | Roney |
| 5,336,344 A | 8/1994 | Wei |
| 5,340,418 A | 8/1994 | Wei |
| 5,716,133 A | 2/1998 | Hosokawa et al. |
| 10,718,527 B2 | 7/2020 | Masten, Jr. |
| 10,738,368 B2 | 8/2020 | Masten, Jr. |
| 2017/0122811 A1 | 5/2017 | Maston |
| 2017/0191143 A1* | 7/2017 | Masten, Jr. ............ C21D 11/00 |
| 2020/0362434 A1 | 11/2020 | Masten, Jr. |
| 2022/0290280 A1* | 9/2022 | Masten, Jr. ............ F27D 21/00 |

FOREIGN PATENT DOCUMENTS

KR 10-2017-0052294 A 5/2017

OTHER PUBLICATIONS

International Search Report and Written Opinion for related application No. PCT/US2022/019639, dated Jun. 29, 2022.

* cited by examiner

*Primary Examiner* — Scott R Kastler

(57) ABSTRACT

A receiver is formed as the physical inverse or relief of at least a portion of a machined part or casting. The receiver has accommodations for sensor systems that monitor the temperature of the part during a radiant heating process which is placed on top of the casting receiver to move through the radiant heating process.

20 Claims, 12 Drawing Sheets

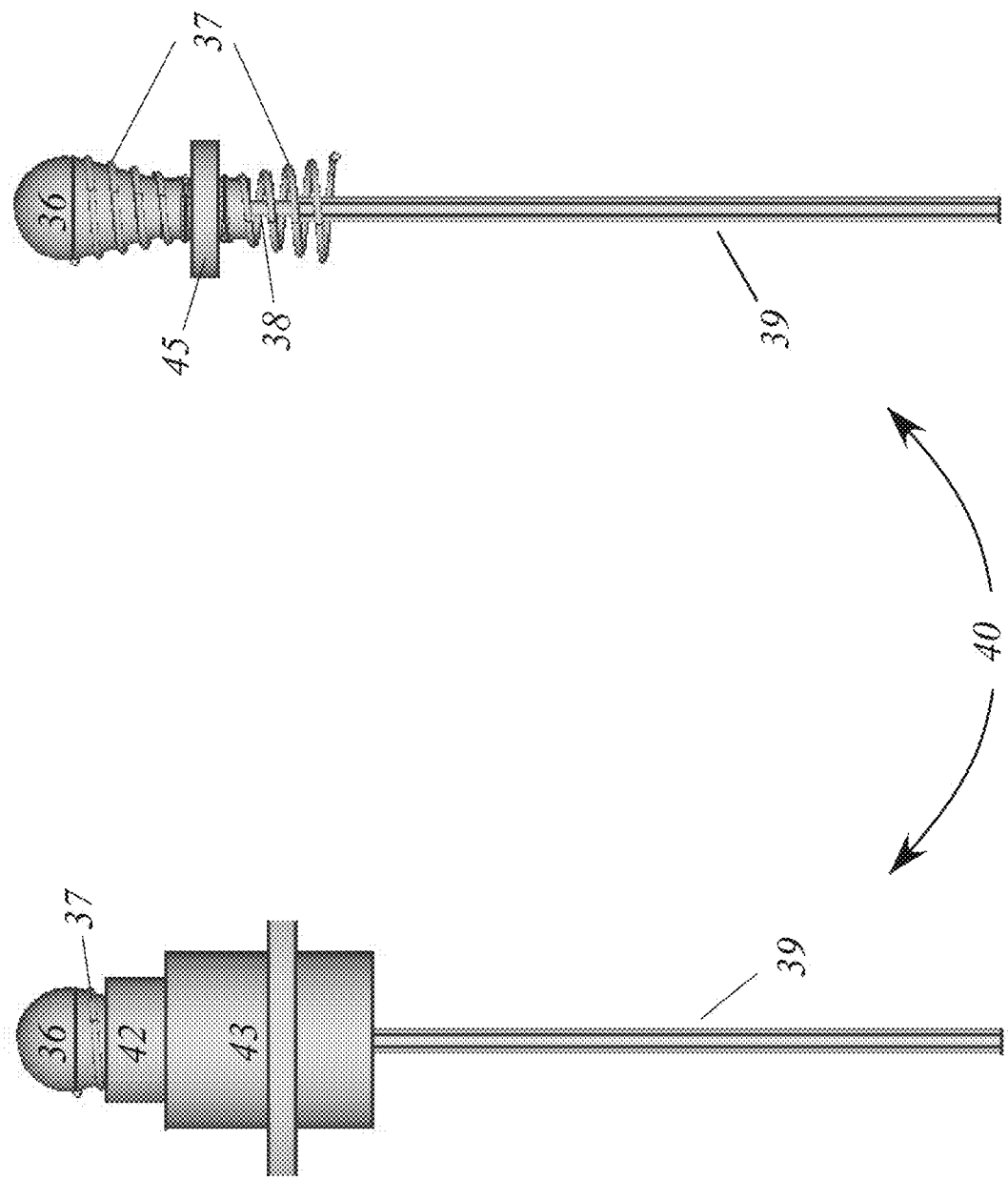

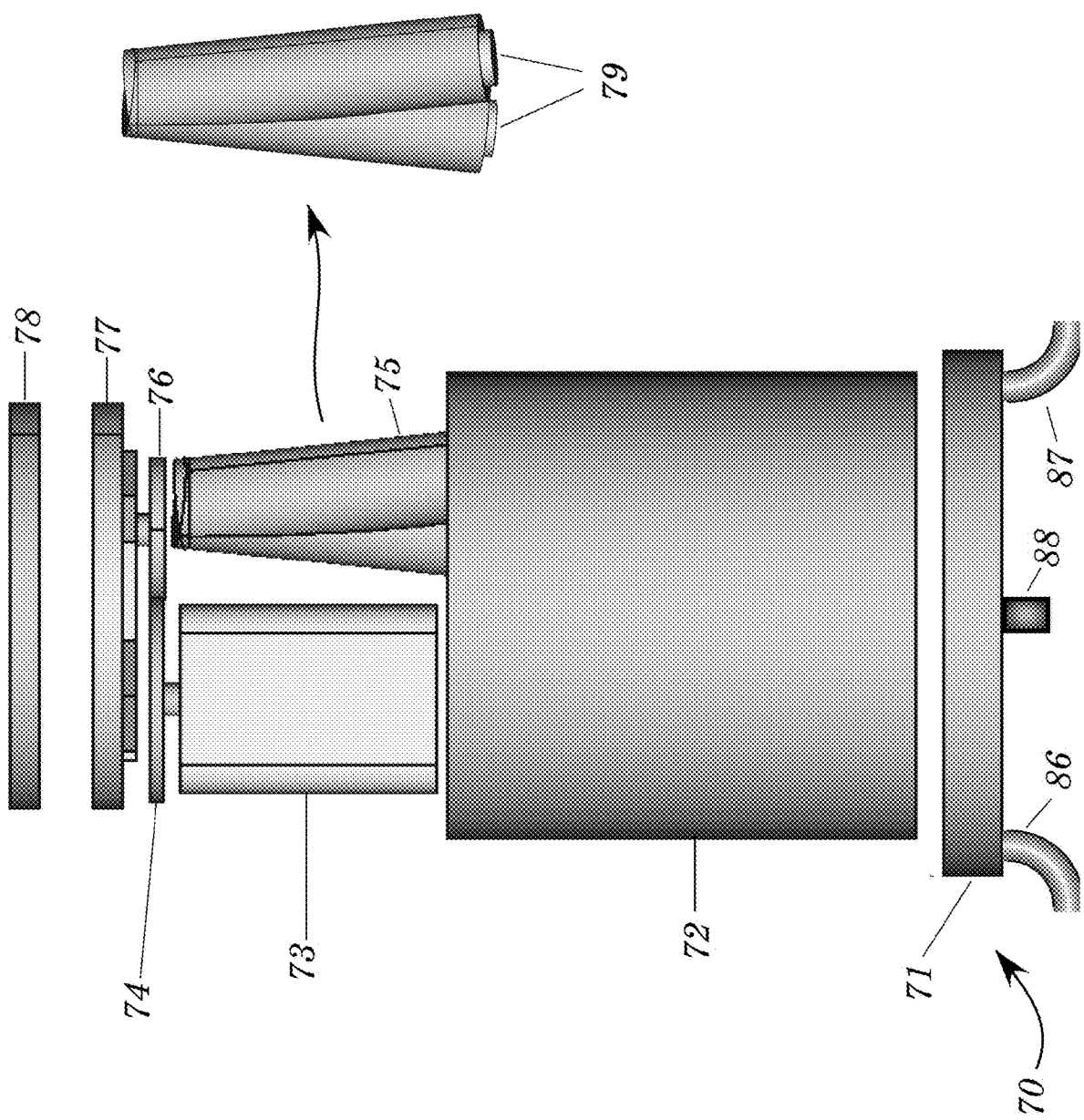

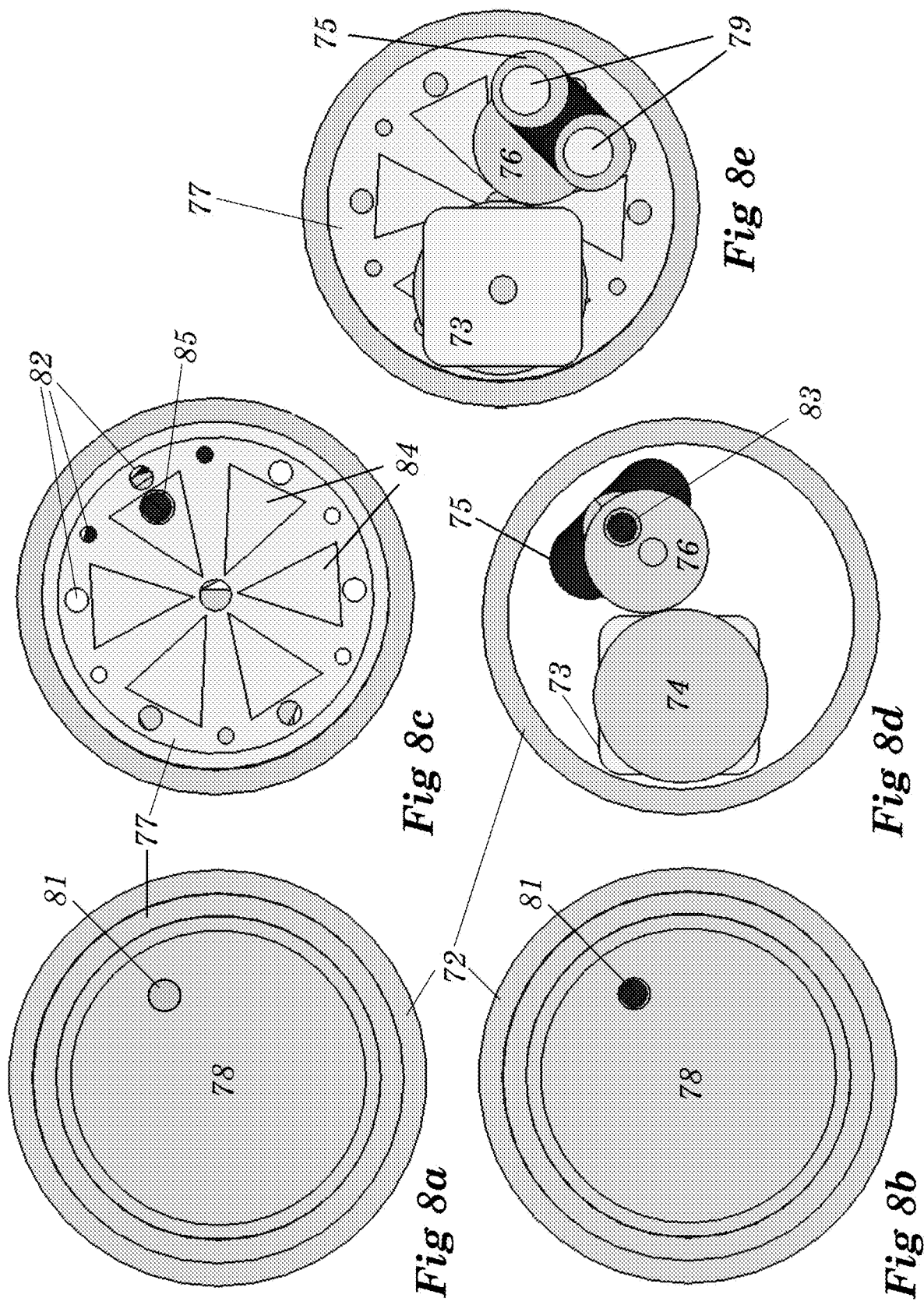

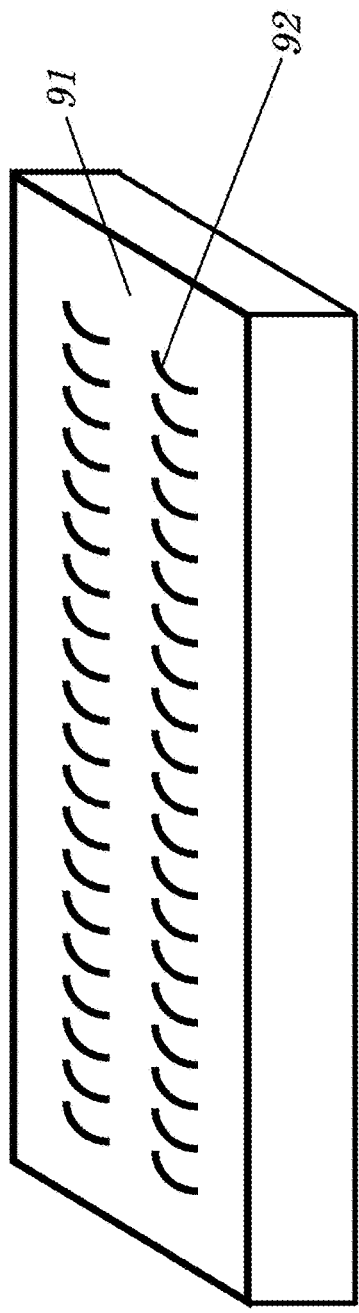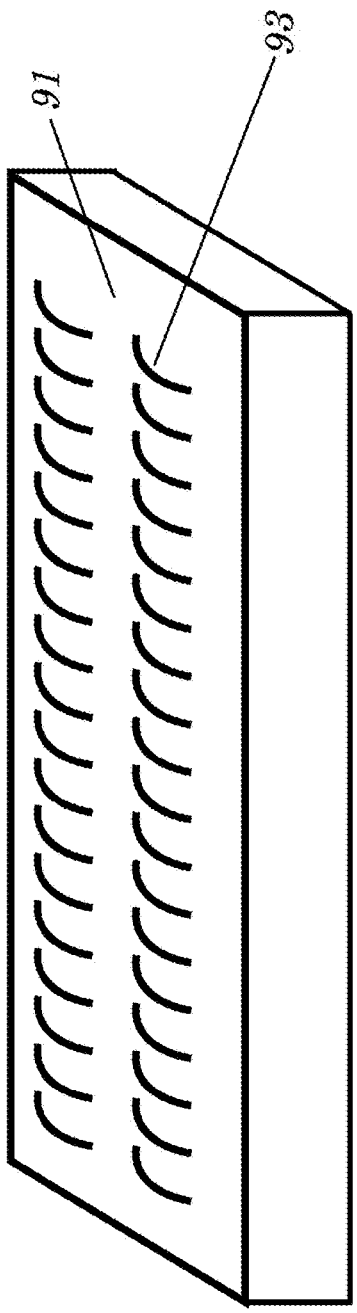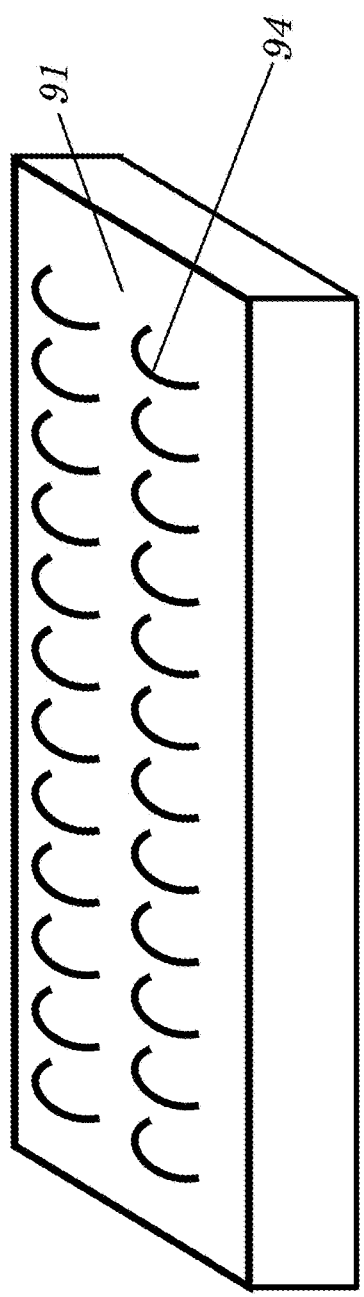

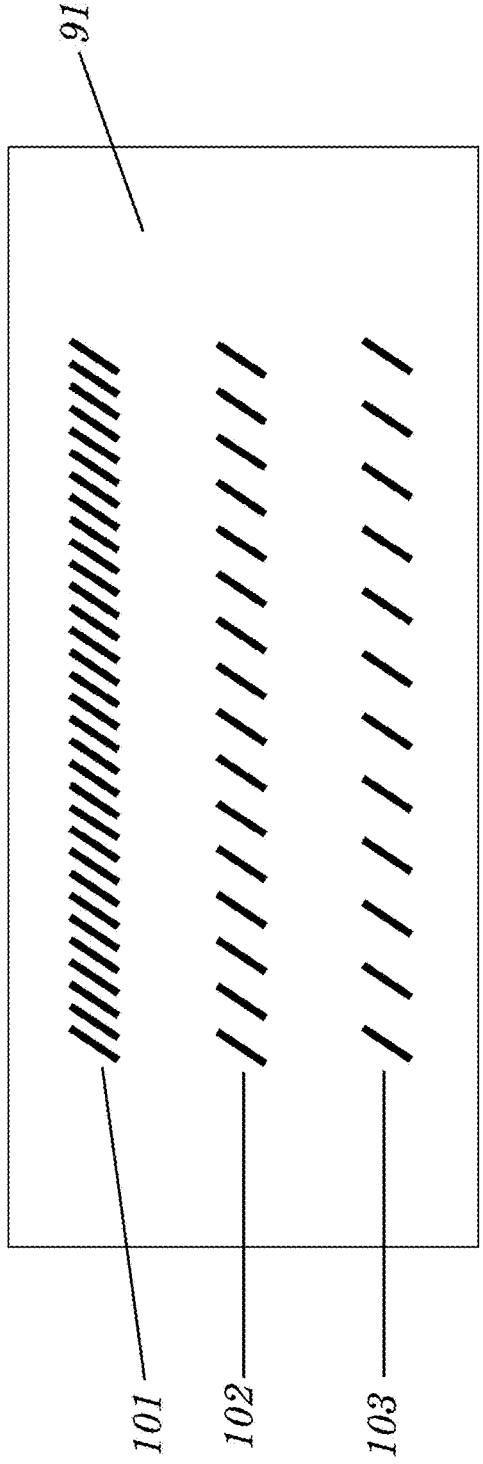
*Fig 10a*
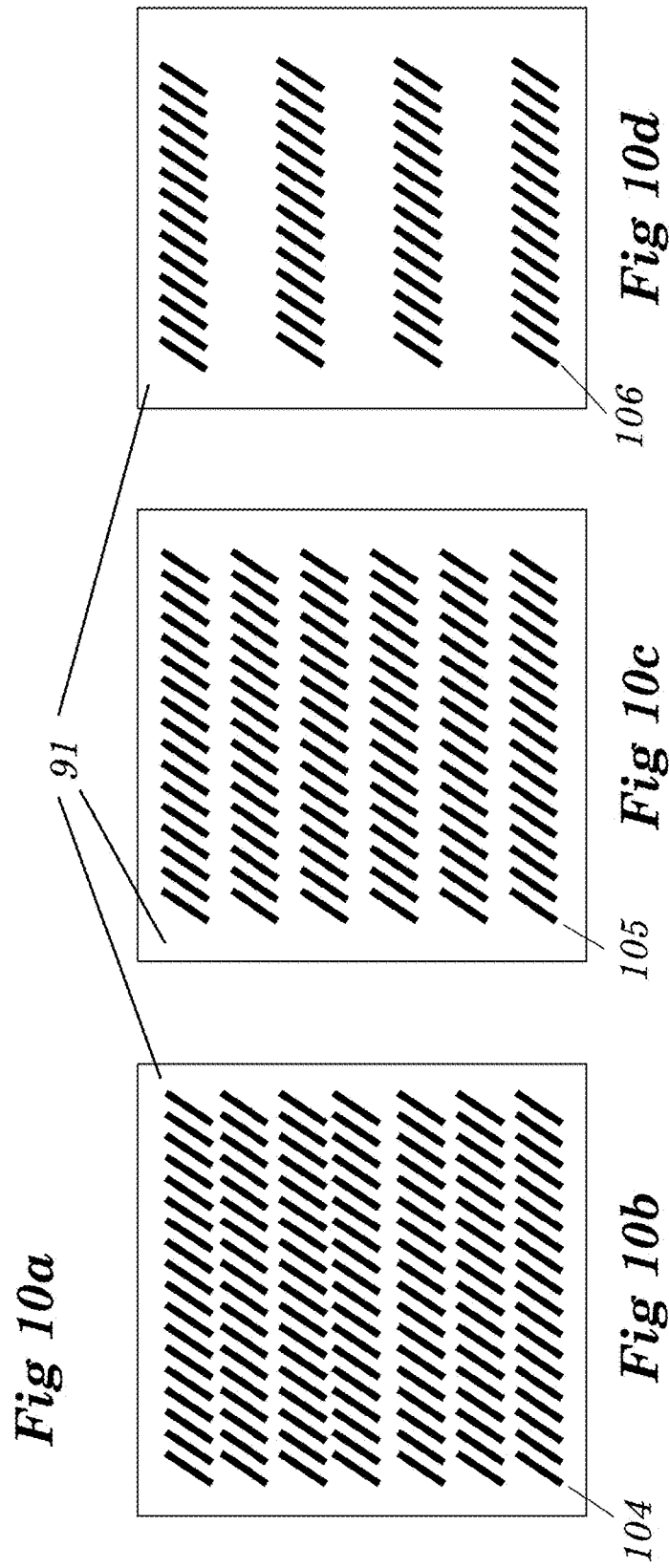
*Fig 10b*
*Fig 10c*
*Fig 10d*

SHIELDING AND DIFFERENTIATING RECEIVER FOR RADIANT HEATING PROCESSES

CROSS REFERENCE TO RELATED APPLICATION

This application claims priority to U.S. Provisional Patent Application No. 63/158,742, filed on Mar. 9, 2021, which is incorporated herein by reference in its entirety.

BACKGROUND

Historically there have been three general technologies applied to measuring temperature of heated metals during industrial processes: 1) the use of a material that changes shape or size in response to the change in temperature, such as a thermometer, 2) the discovery of thermocouples in which an electrical difference between two metals changes in a calibrated way to the change in temperature of the junction of the two metals, and 3) the use of spectroscopy in which the measurement of wavelength of the emitted electromagnetic emissions of a heated object reveals the temperature of the surface of the object.

In between the discovery of thermocouples and the measurement of wavelength was the invention of the optical pyrometer in which infrared transmissive lenses are used to capture and focus the emissions of a heated object onto a thermocouple so that the junction of the two metals is heated to the same temperature as the remote heated object.

All of these techniques to measure temperatures in an industrial process have challenges. These challenges have evolved as the source of heating has moved from coal, to oil, then gas, and then to various forms of electrical heating. Fuel-based heating is largely convection heating, as the hot gases flow around the part to be heated.

Each type of heating has brought forth different challenges to measuring the temperature of the object being heated.

Thermocouple measurement of objects being heated by electromagnetic radiant energy represents a challenge because the objects are being heated from the outside in and the thermocouples are inserted below the surface to get a representative temperature measurement of the part. For a production environment, creating a hole in which to insert a thermocouple is a challenging process and the results might compromise the structural integrity of the object or the aesthetics of the object. In addition, the thermal environment around a part in an oven can be chaotic, especially when radiant emitters are used to heat the part. Therefore, it is difficult to obtain accurate measurements of a part using conventional technologies.

Infrared heating as a form of electromagnetic radiant energy heating has resulted in several challenges to optical temperature measurement in terms of the emissivity of the material, the surface roughness of the material and the shape of the material. Some of these challenges are met with the use of two-color pyrometers, ratiometric measurement technologies or object design to present a shielded blackbody imaging opportunity.

BRIEF SUMMARY

Embodiments of the present disclosure relate to a system and method for heat treating a part, and a receiver that interfaces with the part. The receiver may isolate a temperature sensor that is configured to measure the temperature of the part from infrared radiation and convective currents within a heating chamber, thereby facilitating accurate temperature measurement and control of the process. Additional embodiments relate to a system and process for delivering different amounts of infrared energy to different areas of a part, thereby providing different heat treatment conditions to a single part within a single process. In an embodiment, a process includes heat treating a cast part while the cast part retains heat from the casting process.

A system for heat treating a part may include an oven chamber with a plurality of infrared emitters configured to direct infrared energy towards the part, and a receiver with an outer surface configured to contact a corresponding surface of the part, the receiver including one or more temperature sensor, wherein the receiver is configured to shield a temperature sensor of the receiver from infrared energy radiated from the infrared emitters and convective currents within the chamber. The receiver may be configured to shield a plurality of temperature sensors from direct infrared emissions from the infrared emitters and reflections from the infrared emissions.

In an embodiment, a portion of the receiver that contacts the part is a physical inverse of a portion of the part that mates with the receiver in three dimensions. The receiver may block openings in the part to block the infrared energy and the convective currents from passing through the openings.

The plurality of infrared emitters may include a first set of infrared emitters disposed in a roof of the oven chamber and configured to radiate infrared energy onto an upper surface of the part, and a second set of infrared emitters disposed in a side of the oven chamber and configured to radiated infrared energy onto a side surface of the part.

The at least one temperature sensor may include a contact temperature sensor and a non-contact temperature sensor. In an embodiment, the receiver includes a spring-loaded contact temperature sensor that extends from a surface of the receiver when no part is present on the receiver, and is configured to compress and contact the part when the part is placed on the receiver.

The receiver may include a non-contact temperature sensor assembly comprising a non-contact temperature sensor, a window and a motor. The motor may be configured to move the window from a first position to a second position to expose the part to the non-contact temperature sensor, and configured to move the window back to the first position to block the part from the non-contact temperature sensor when the non-contact temperature sensor is not sensing a temperature of the part.

The part may be a cast aluminum part, and in particular, a wheel for a vehicle. The system may be configured to heat the part to a temperature of at least 900° F.

A method for heat treating a part may include locating the part on a receiver so that an outer surface of the receiver contacts a corresponding surface of the part, the receiver including at least one temperature sensor, and providing energy to a plurality of infrared emitters configured to direct infrared energy towards the part and disposed in an oven chamber, wherein the receiver is configured to shield each temperature sensor from infrared energy radiated from the infrared emitters and convective currents within the chamber.

The receiver may be configured to shield the temperature sensor from direct infrared emissions from the infrared emitters and reflections from the infrared emissions, and a portion of the receiver that contacts the part may be a physical inverse of a portion of the part that mates with the receiver in three dimensions. The receiver may block openings in the part to block the infrared energy and the convective currents from passing through the openings.

In an embodiment, the method includes measuring a temperature of the part using at least one of a contact temperature sensor and a non-contact temperature sensor. The temperature may be measured by a spring-loaded contact temperature sensor that extends from a surface of the receiver when no part is present on the receiver, and is configured to compress and contact the part when the part is placed on the receiver.

In an embodiment, measuring the temperature includes activating a motor of a non-contact temperature sensor assembly to move a window in the assembly from a first position to a second position to expose the part to a non-contact temperature sensor, measuring the temperature while the window is in the second position, and activating the motor to move the window back to the first position. The part may be a cast aluminum part, and in particular, a wheel for a vehicle. The heat treatment may be annealing, case hardening, precipitation strengthening, tempering, solutionizing, or normalizing.

DESCRIPTION OF DRAWINGS

FIG. 1a shows an elevation view of the receiver beneath the part. FIG. 1b shows as isometric view of the same receiver and the part posed above the receiver as it is lowered to be seated on the receiver. FIG. 1c shows the part seated fully on the receiver as it would be for a heating process. FIG. 1d shows a similar view as FIG. 1c, in which the part and receiver are shaded to show the darker part as it sits upon the lighter-shaded receiver. FIG. 1e shows a plan view of the bottom of a casting, with thermal sensors being placed in holes drilled in the casting for that purpose.

FIG. 5a illustrates another embodiment of a contact thermocouple structure 40 which can be placed within a receiver, for example to measure the temperature at the hub or spoke of a wheel casting. FIG. 5b shows an inner spring structure of the thermocouple structure 40, having the outside ceramic components removed.

FIG. 7 shows a vertically exploded front elevation view of an embodiment of a non-contact thermal sensor system or assembly 70 which can be placed within a receiver, for example to measure temperatures at a hub or spoke of a wheel casting. The inset of FIG. 7 contains an inset showing a non-contact sensor isolated from the system.

FIGS. 8a-8c show various plan views of an embodiment of a non-contact sensor system, displaying the alignment of the various components to illustrate how a non-contact sensor sees through the aligned aperture to measure the temperature of a casting in the area of interest. FIG. 8a shows a top plan view where a shutter disk is situated such that a top observation hole is blocked. FIG. 8b shows a top plan view where the shutter disk is rotated such that the observation hole is open to the aperture in the shutter disk. FIG. 8c is a top plan view with the housing cover conceptually removed to display the housing end flow channel plate and its configuration. FIG. 8d is a top plan view with the housing cover and housing end flow channel plate conceptually removed to display the positioning of additional components of the assembly, including a motor gear, shutter disk, motor housing and sensor housing. FIG. 8e is a bottom plan view with the housing base removed to show the bottom views of these non-contact sensor system components.

FIGS. 9a-9c show various configurations of heating-elements within a refractory base with differing areas of heating-element wire coil exposed (that is, the ratio of exposed wire to wire embedded in the refractory base). FIG. 9a shows a configuration with the least amount of the coil of heating-element wire exposed, increasing the radiant temperature of the emitter. FIG. 9b shows a configuration with a larger amount of the heating coil exposed for a decreased radiant temperature. FIG. 9c shows a configuration with the greatest amount of the coil exposed, for even lower emitted radiant temperature.

FIGS. 10a-10d show different horizontal and vertical density factors for heating-element coils embedded within a refractory base. FIG. 10a shows three example levels of horizontal density for the wire coils: least horizontal density, medium horizontal density and greatest horizontal density. FIG. 10b shows an example heating element configuration with greatest horizontal and vertical densities. FIG. 10c shows an example heating element configuration with high horizontal density and medium vertical density. FIG. 10d shows an example heating element configuration with medium horizontal density and lesser vertical density.

DETAILED DESCRIPTION

Figure 1B:
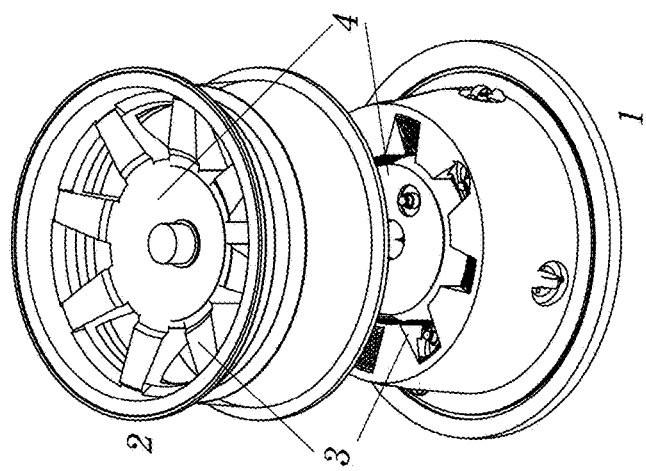
FIGS. 1a-1e illustrate an embodiment of a part which is a wheel casting and a receiver that is a machined-refractory relief of one side of the part.
Figure 1A:
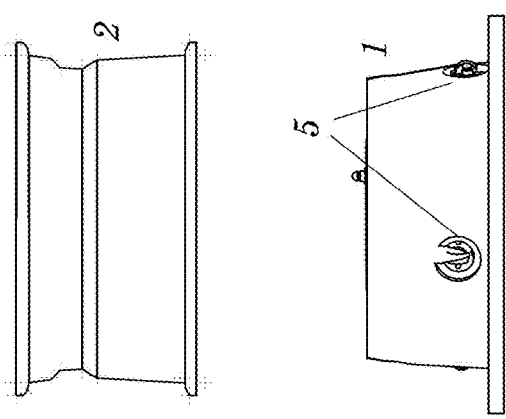
Figure 1D:
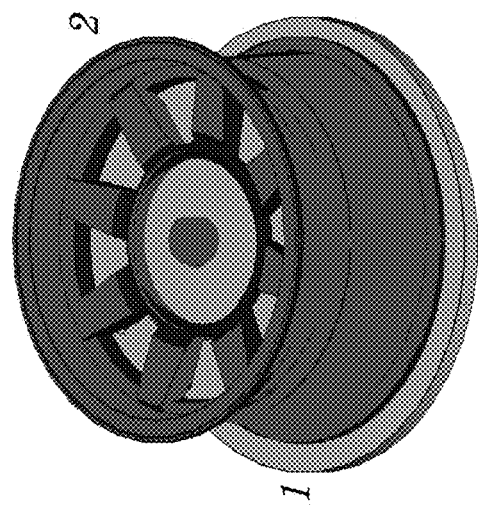
Figure 1E:
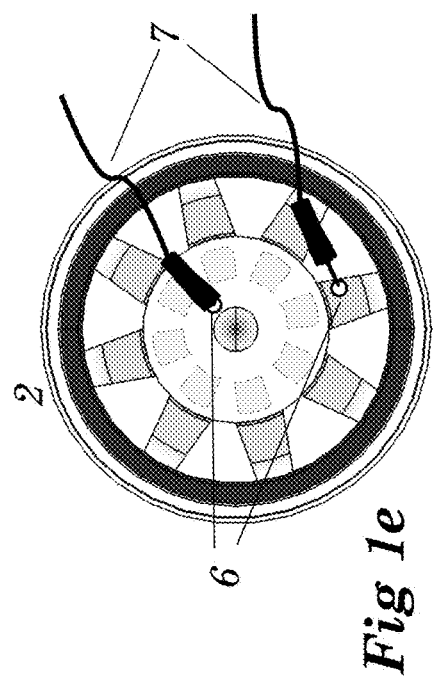
Figure 1C:
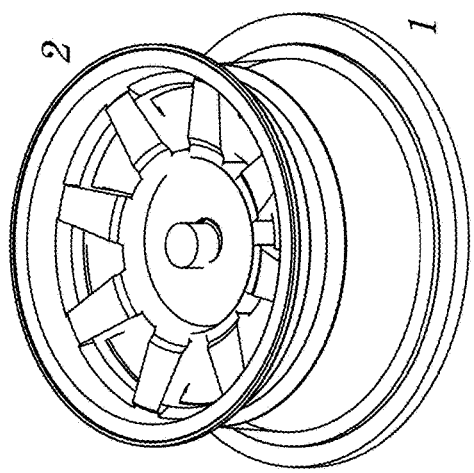
Figure 2:
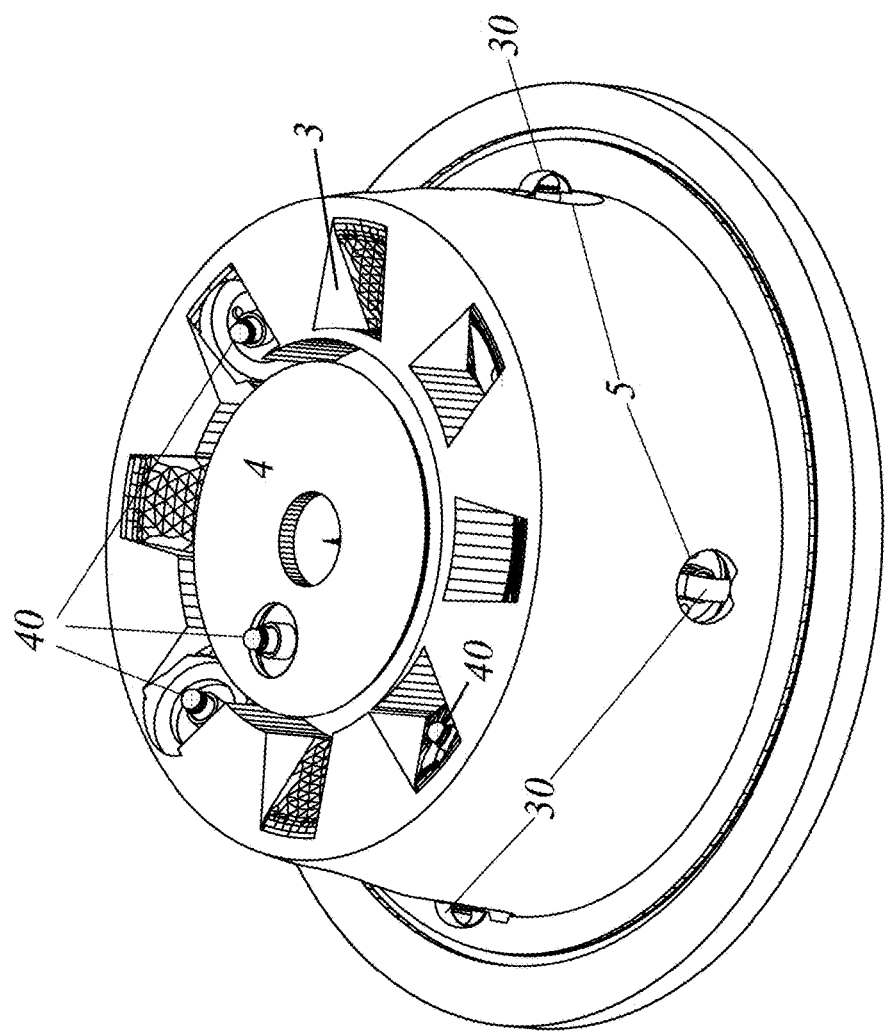
FIG. 2 is an isometric view of an embodiment of a machinable refractory receiver. Connecting surfaces of thermocouple structures are visible within the casting receiver.
Figure 3B:
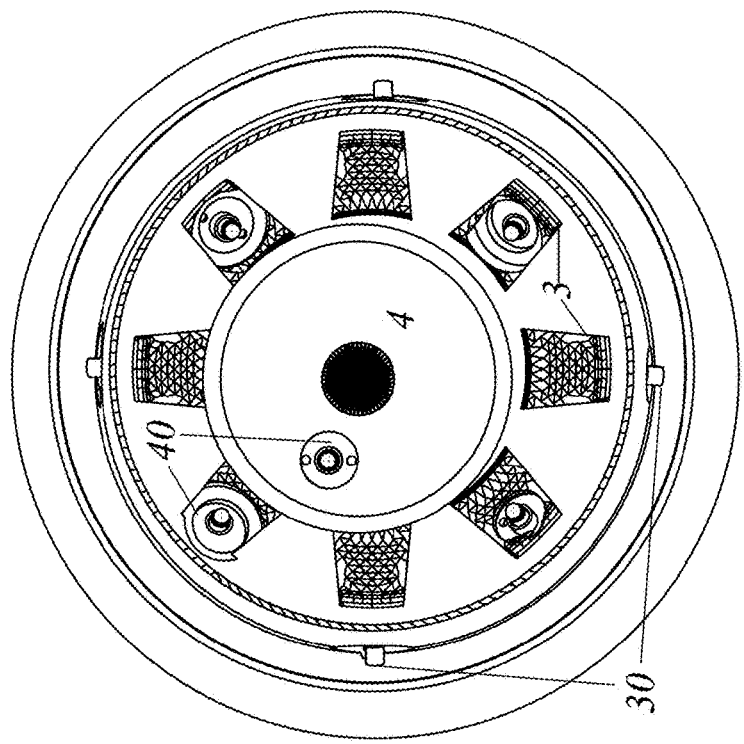
FIG. 3a is a side view and FIG. 3b is a top view of the receiver of FIG. 2.
Figure 3A:
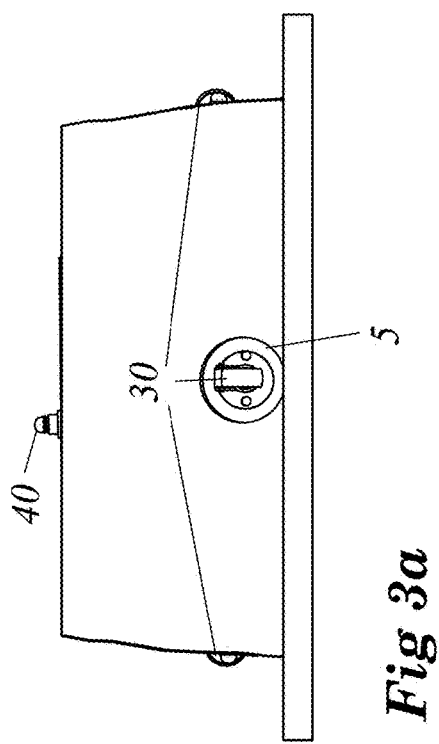

The following list provides a number of specific descriptions and examples of components present in the figures. The descriptions in the list are illustrative of specific embodiments, and should not be construed as limiting the scope of this disclosure.

REFERENCE

| Markings | Description |
| --- | --- |
| 1 | Receiver |
| 2 | Part (metal alloy cast wheel for this illustration) |
| 3 | Feature of casting reflected in casting receiver |
| 4 | Feature of casting reflected in casting receiver |

-continued

| Markings | Description |
|---|---|
| 5 | Hole for accommodating sensor structure |
| 6 | Hole in bottom of casting for receiving thermal sensor |
| 7 | Thermocouple |
| 30 | Rim-type contact sensor assemblies |
| 31 | Beryllium copper (BeCu) rim contact surface spring (spoon) |
| 32 | Machinable-ceramic isolating shade sleeve for rim-type sensor 30 |
| 33 | Machinable-ceramic isolating spring cup mount for rim-type sensor 30 |
| 34 | Stainless steel roll pin to connect spoon spring 31 to spring cup mount 33 |
| 35 | Copper spring mount for rim-type sensor 30 |
| 36 | BeCu spring mesh pad |
| 37 | BeCu spring |
| 38 | Thermocouple |
| 39 | Thermocouple wire |
| 40 | Hub or spoke-type contact sensor assemblies |
| 42 | Machinable-ceramic isolating shade sleeve for hub or spoke-type sensor 40 |
| 43 | Machinable-ceramic spring cup mount for hub or spoke-type sensor 40 |
| 45 | Copper spring mount for hub or spoke-type sensor 40 |
| 60 | Heat treatment oven |
| 61 | Bank of three roof-mounted radiant emitters |
| 62 | Bank of four wall-mounted radiant emitters |
| 63 | Base for mounting casting receiver |
| 64 | Thermal path from emitter through casting 2 to spoke-type sensor 40 |
| 65 | Thermal path from emitter through casting 2 to rim-type sensor 30 |
| 68 | Control computer |
| 70 | Non-contact sensor system/assembly |
| 71 | Base of non-contact sensor housing |
| 72 | Outer housing for non-contact sensor assembly |
| 73 | NEMA-8 Motor and housing |
| 74 | Gear wheel attached to NEMA-8 motor 73 for turning shutter disk 76 |
| 75 | Non-Contact sensor holder |
| 76 | Rotating Shutter Disk with aperture 83 |
| 77 | Housing end flow channel plate |
| 78 | Cover for non-contact sensor housing |
| 79 | Non-contact thermal sensor |
| 81 | Thermal observation window within sensor housing cover 78 |
| 82 | Air flow hole within end-flow channel plate to allow cooling air to pass |
| 83 | Aperture within shutter disk 76 to allow non-contact sensor within holder 75 to sense temperature with non-contact thermal sensor 79 |
| 84 | Air thermal stability pads |
| 85 | Thermal observation window within housing end flow cover plate 77 |
| 86 | Air flow intake |
| 87 | Air flow output |
| 88 | Electrical connector for power and signal |
| 91 | Refractory material in which coils of heating-element wire are embedded |
| 92 | Portion of heating-element wire exposed for minimum infrared-radiating area to increase radiant temperature |
| 93 | Portion of heating-element wire exposed for mid-level infrared-radiating area and medium radiant temperature |
| 94 | Portion of heating-element wire exposed for maximum infrared-radiating area and reduced radiant temperature |
| 100 | Radiant emitter |
| 101 | Heating-element wire coil with high turn density |
| 102 | Heating-element wire coil with medium turn density |
| 103 | Heating-element wire coil with low turn density |
| 104 | Heating-element wire coils arrangement with high coil density |
| 105 | Heating-element wire coils arrangement with medium coil density |
| 106 | Heating-element wire coils arrangement with low coil density |

As can be seen in the included drawings FIGS. 1a-1e, FIG. 2 and FIGS. 3a-3b, the physical inverse of a cast or machined part 2 can be created from machinable refractory materials such that they are minimally transmissive or conductive of thermal energy. Embodiments of a receiver 1 may extend along an entire bottom surface of a part 2, so an embodiment may have the shape of the inverse of one side of a part. However, embodiments are not limited to covering an entire side or half of a part. In other embodiments some portion, such as the lower one-sixth of the inverse of the part, can be used to position the part against gravity and seal against the lower portion of the part which is not usually subject to direct radiant exposure. A non-symmetrical portion of the part could be represented by an inverse of the part that contacts portions of the part that are not typically exposed to radiant energy during a radiant heating process.

Although the present disclosure occasionally refers to the receiver 1 as a "casting" receiver, the receiver may be used for a part in a heat treatment process regardless of whether the part is a cast part.

In some embodiments, a receiver 1 may comprise sufficient material to block most or substantially all infrared paths, including one or both of direct and reflective radiant paths, to a portion of the part 2. In some embodiments, the receiver 1 provides a seal that prevents airflow over portions of the part 2, especially portions whose temperature is being measured. The receiver 1 may provide refractory material that blocks openings in the part through which convective currents and radiant energy could otherwise pass, such as the spaces between the spokes of the wheel of part 2 shown in FIG. 1b. Accordingly, embodiments of a casting receiver 1 may be used to control the transfer of thermal energy to a part 2 by effectively blocking radiant and convective heat transfer to a portion of the part. Blocking radiant and convective thermal transfer to sections of the part can provide a controlled transfer of thermal energy to the part, and facilitate accurate measurements of the temperature of the part that are minimally affected by the thermal environment around the part.

In some embodiments, the receiver 1 may be used to index or locate a part 2 in a repeatable manner. For example, the receiver 1 may have shapes that correspond to shapes of a part 2 so that the physical orientation of the part 2 is controlled by the receiver. In an embodiment in which the part 2 is a wheel, the receiver 1 may have protrusions that receive the outer diameter of the wheel, so that every wheel that is loaded into the casting receiver is axially oriented, or centered, by the receiver. When the part is an asymmetrical part, the receiver may have corresponding asymmetrical features that ensure that every part that is placed on the receiver is placed in the same location. The consistent loading orientation can be helpful when interfacing with a heating oven with a plurality of heating elements that are configured to deliver radiant energy in a pattern that is specific to a part's geometry.

As illustrated in FIGS. 1*a*-1*d*, a receiver 1 can be used to "receive" the part 2 to be heated so that a portion of the part 2 will be shielded from radiant energy and isolated from conductive thermal energy, either through the atmosphere in the region of heating or from conductive thermal energy through the physical constructs positioning the article against gravity. Therefore, in some embodiments, a part 2 is only in physical contact with a refractory material of the receiver 1 and assemblies for measuring temperature of the part, such as the thermocouple assemblies described by this disclosure. In addition, the receiver 1 may physically support the part 2.

A machinable refractory can be used to create shielded, recessed mounting points 5 for specially prepared thermocouples 38 within contact sensors 30, 40 that are mounted such that when the part 2 to be heated is positioned on the receiver 1, a highly conductive thermal energy path is created from a location on the surface of the part 2 to the thermocouples 38. In this way, the thermocouples 38 only sense heat transferred to the part 2 from radiant thermal energy that has been coupled to the far side of the part 2 and traveled by conduction through the part to the thermocouple 38. In the process disclosed herein, the thermal energy measurement may use contact sensors, non-contact sensors, or a combination of contact and non-contact sensors.

Isolated sensor systems may be provided at multiple locations on the part. Such an embodiment enables a previously unavailable capability to control the heating of different areas in a part with different characteristics including different thicknesses, surface characteristics, desired heat treatments, materials, or those components which can be heated by radiant exposure vs. those that are not exposed to a radiant source by separately measuring the temperatures of the individual components of a connected part 2 in real-time. The constructed receiver-isolated sensor systems sense thermal energy that propagates through the part 2 by conduction through a known path with minimal interference or noise from other sources.

This has great value if thermal energy applied to a part is applied fast enough and at a high enough power to substantially change the energy being applied to the different areas of a part faster than the thermal conductivity of a part spreads the thermal energy uniformly throughout the part.

When the intensity of radiant energy delivered to a part is high, localized and surface heating effects in the radiant environment can make measurement of the interior temperature of the part more difficult. Measuring the temperature of a section of a part that is isolated from the radiant environment is a more accurate measure of the part itself.

Embodiments of the present disclosure relate to a process for heat treating a part 2. The heat treatment may include selectively delivering thermal energy of different levels to different portions of a part. For example, when the part is a wheel, an amount of thermal energy may be provided to the spoke parts of the wheel to provide ductile properties, while a different amount of thermal energy is directed to the hub portion of the wheel to provide a hard surface that interfaces with mounting surfaces of a vehicle, such as nuts and bolts. Accordingly, a heat treatment oven may be outfitted with a plurality of infrared heating elements that are configured to deliver different amounts of thermal energy to different portions of a part that is being heat treated.

Electrical heating ranges from resistive heating of a metal object itself or an electric resistive element heating the air or water in which a target object is immersed, to inductive heating where magnetic flux is induced into a conductive material, inducing an electrical current, and finally to radiant heating where electromagnetic radiant energy is beamed or directed to the object being heated. For highly thermally conductive materials, only radiant heating offers the opportunity for selective heating or heating sections of an entire part at different rates or to different temperatures.

Figure 6:
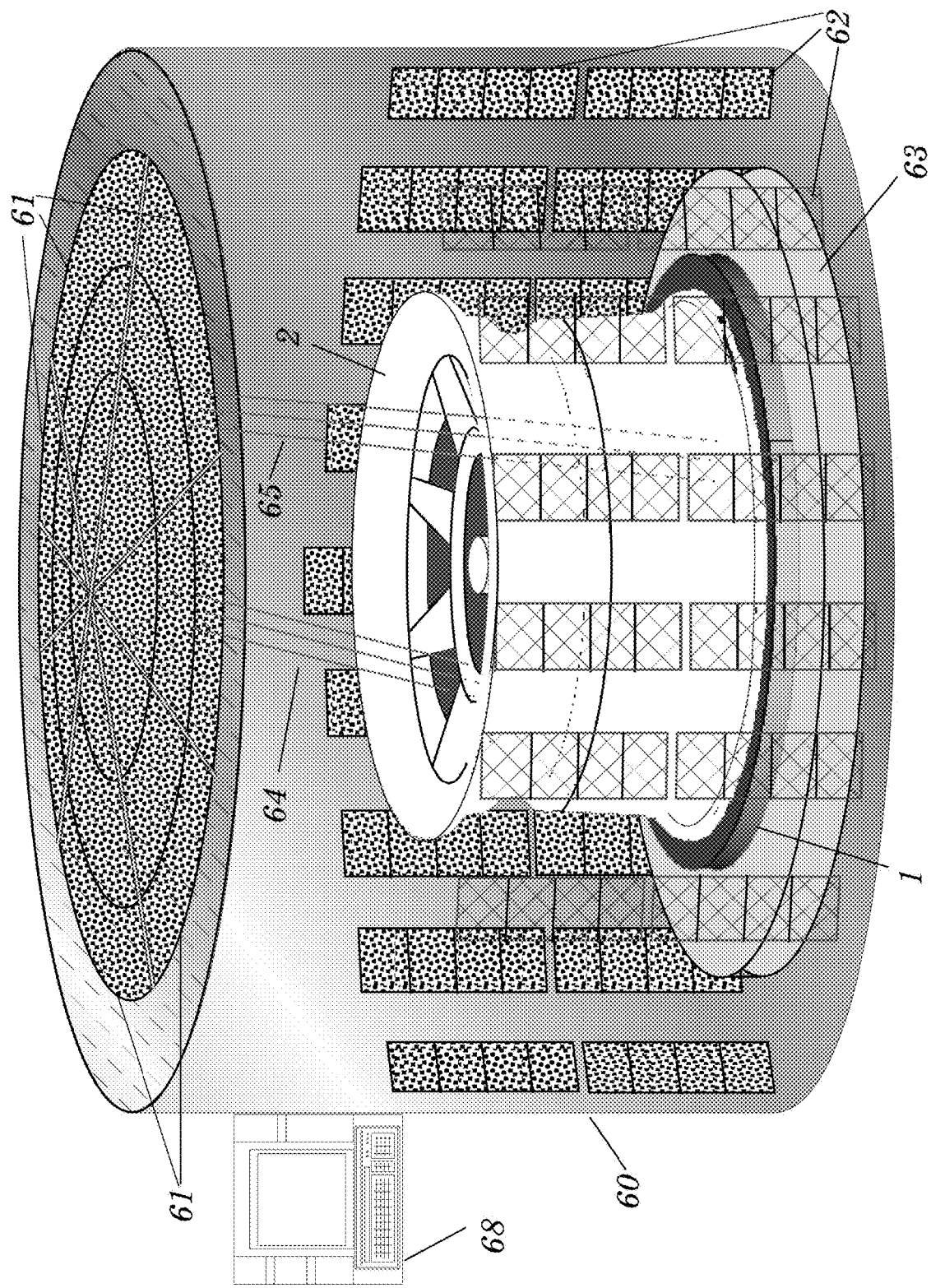
FIG. 6 shows a receiver with a part positioned inside a heat treatment oven, with emitters mounted on the roof and spaced throughout the walls.

An embodiment of a structure that applies different amounts of thermal energy to different locations of a part 2 is illustrated in FIG. 6. FIG. 6 illustrates an embodiment of a heat treatment oven 60 that is being used to heat treat a part 2 that is a cast wheel. The sides, ceiling and floor of oven 60 may be constructed of refractory and metal materials, and include exhausting and cooling components as known in the art. In an embodiment, the sides and ceiling of the oven 60 may be decoupled from the floor, and placed over a stationary part 2 to introduce the part 2 into the oven 60. In another embodiment, the oven 60 may include a door, or the ceiling may be configured as a lid to facilitate part loading.

The part 2 is resting on a casting receiver 1 that substantially covers an entire lower surface of the part 2. Except for spaces to accommodate temperature sensors, an upper surface of a receiver 1 may contact most or substantially all of the lower surface of the part when the part is located on the receiver. When the part is a wheel, the casting receiver 1 may fill spaces around the hub and between spokes of the wheel, thereby preventing infrared reflections and conductive currents that would otherwise affect inner surfaces of the wheel. Although the embodiment of the chamber of oven 60 in FIG. 6 has a cylindrical shape, other embodiments may have different shapes.

The casting receiver 1 is mounted on a base 63, which may provide mechanical support for the casting receiver and protect the lower surface of the casting receiver from damage when it is loaded and unloaded into an oven. In some embodiments, the casting receiver 1 is made of a ceramic refractory material that is a relatively low-density porous material. In such embodiments, the refractory material may be structurally reinforced by a different material such as steel. The base 63 may be disposed on a lower surface of the casting receiver 1 to prevent abrasion of the lower surface when handling the receiver. In addition, portions of the base 63 may extend upwards from the base 63 to mechanically support portions of the casting receiver 1 that are susceptible to damage from handling or loading parts.

A first set of banks of infrared radiant emitters 61 is disposed on a roof or upper surface of the heat treatment oven 60, and a second set of banks of infrared radiant emitters 62 is disposed on sidewalls of the heat treatment oven. Each set contains a plurality of banks and each bank contains a plurality of infrared radiant emitters. In this embodiment, the first set (roof or upper surface) contains eight banks 61, each bank containing three infrared radiant emitters; the second set (on sidewalls) contains thirty banks 62, each bank containing four infrared radiant emitters. Infrared radiation is directional, so the radiation from the emitters in the roof may follow two or more different paths 64 and 65, which affect two or more different areas of the part 2. The emitters may be controlled individually, in banks, or as a set to emit different levels of energy, so that the two or more different areas of the part are heated to different temperatures. In an embodiment in which the emitters use embedded coils, the amount of energy provided to each coil may be controlled individually, and any combination of coils may be controlled to provide different zones of thermal energy transfer.

The infrared heating elements in the heat treatment chamber may comprise a metal coil that is embedded in a refractory material, such as the elements described in U.S. Pat. Nos. 10,738,368, 10,718,527 and U.S. application Ser. No. 17/003,892. In some embodiments, the infrared emitters may be recessed in pockets of refractory material that block radiation that would otherwise travel sideways from the emitter, thereby enhancing the directionality of the emitters. In another embodiment, the emitters may be recessed in polished metal wells that reflect sideways radiant emissions from the infrared heaters to focus infrared energy into a direction orthogonal to a front surface of the emitters. In other embodiments, an object such as a grating or a refractory structure with an opening may be disposed between the emitters and the part 1 to enhance directionality of the emitted radiation to concentrate the emitted energy on a specific location of a part.

FIGS. 9a-9c and FIGS. 10a-10d illustrate various embodiments of a heating element configured to emit different amounts of infrared radiant energy based on the amount of heating element wire 92, 93, 94 which is exposed versus the amount of heating element wire embedded in the base material 91 and based on the density 101-106 of the wire coils. Several features of these embodiments of infrared emitters enable selective heating. Reducing inner coil and row spacing increases thermal density for a given applied voltage and current, while reducing coil exposure increases radiant temperature. These two design constraints enable shifting the range of emitter wavelength or radiant temperature and the radiant power density of the emitter.

In an embodiment, the radial centers of adjacent turns of emitter coils can be spaced apart by between 1.1 and 7 wire diameters and still achieve even radiant projection within the near field where the distance to the target is less than half the smaller of the width or height dimension of the heating surface. Put another way, two adjacent turns of a coil may be separated by a gap of from 10% to 600% of the width (diameter) of the coil wire, from 20% to 500% of the wire diameter, etc. In an embodiment, two sets of coils have two different configurations within this range. For example, an embodiment may include a first set of coils which may comprise a first coil 101 in which radial centers of adjacent turns are spaced apart by from 1.1 to 6 wire diameters, and a second set of coils in which radial centers of adjacent turns are spaced apart by from 1.5 to 7 wire diameters. The spacing between radial centers of the wires of a first coil and a second coil within an oven 60 may vary by 10% to 700% of the diameter of a wire, or from 20% to 500%, or from 100% to 250%. In an embodiment, the spacing between turns of a first coil is at least 25%, 50%, 100%, 200% or 500% more than the spacing between turns of a second coil within an oven.

The row spacing between edges of adjacent rows (coils) can vary between 1.1 wire diameters and 3 row diameters and still maintain an even radiant projection in the near field. Here, a row diameter is the largest coil diameter to the outside edges of the coil wire above the refractory material in which it is embedded. In an embodiment, the coils are staggered so that portions of the coils embedded in the refractory material 91 are spaced apart from one another by at least 10% of a wire diameter to prevent an electrical short. In an embodiment, an oven 60 has a first coil arrangement 104 in which exposed portions of coils are spaced apart by a first distance that is less than a diameter of the exposed portions of the coils, and a second coil arrangement 106 in which exposed portions of coils are spaced apart by a second distance that is more than a diameter of the exposed portions of the coils. The coil spacing of two different coil arrangements within an oven 60 may differ by at least 10%, 25%, 50%, 100%, 200% or more of a diameter of the exposed portion of the coils.

Since the effectiveness of radiant transmission is proportional to the fourth power of the difference in temperature between the source and the target, a higher temperature low thermal density emitter may be used to heat a low mass target component along a first thermal profile to a first final temperature, than a higher mass target component that is heated by a high thermal density emitter at a lower temperature. In an embodiment, heating a part 2 includes heating a lower mass portion of the part using a first radiant emitter 100 and heating a higher mass portion of the part using a second radiant emitter 100. The first radiant emitter 100 directed at the lower mass portion may have a lower coil density, which may be achieved by greater spacing between adjacent turns of a coil or between adjacent rows of coils, compared to the second radiant emitter 100. In addition, coils of the first radiant emitter 100 may extend further from the refractory material 91 in which they are embedded than coils of the second radiant emitter. For example, the configuration of the depth of coils 92 of the first radiant emitter 100 may be similar to the embodiment shown in FIG. 9a, while the configuration of the depth of coils 94 of the second emitter 100 may be similar to the embodiment shown in FIG. 9c. In an embodiment, an emitter 100 may be one or more row of coils coupled to a common supply voltage. In another embodiment, an emitter 100 comprises a set of coils within a single enclosure.

Oven systems designed to heat treat a particular part could have a plurality of emitters 100 across the roof and the sides of the oven chamber with emitters of several different thermal densities and several different operating temperature ranges each individually controlled to follow a particular profile to a final temperature according to the metallurgy and intended usage of the particular component of the part.

In an embodiment in which the part 2 is a casting, the casting may be "profiled" by inserting thermocouples 7 into a hot casting immediately after being removed from the mold and then subjecting the casting to a notional heating profile for different casting components. The thermocouples 7 may be placed in holes 6 that are drilled into the casting or resulting from protrusions positioned in the mold for the purpose of creating the holes. The notional heating profile may include a particular combination of infrared heating elements 100 as well as the amount of energy over time applied to the heating elements. The combination of infrared heating elements 100 may include elements that differ in one or more of the location of the heating elements, the spacing between rows of coils in the heating elements, the spacing between adjacent coils in each row, and the distance the coils protrude from the refractory material in which they are embedded.

The individual casting components may be parts of the casting with different dimensional characteristics, or parts of the casting for which different heat treatment is desired. For example, in an embodiment in which the casting is a wheel, the separate components may be the hub, the spokes and the rim. The profiling process may monitor upper and lower sides of the hub, the spokes and the rim using thermocouples that are inserted into the casting to monitor the temperature of the interior at several specific locations in response to the heating profiles. Simultaneously, contact or non-contact sensors coupled to a casting receiver 1 may be monitored to develop a corresponding control profile for subsequent heat treatment for use in the absence of the inserted thermocouples 7. This process may be repeated until a heating profile produces a desired result.

After a desired heating profile is determined, the heating profile can be monitored and controlled by a program in a control computer 68 using only contact and/or non-contact sensors coupled to casting receiver 1 to verify that the heating profile is proceeding as expected in production operations, and to adapt heating parameters as appropriate.

Embodiments of the present disclosure may be especially beneficial when the thermophysical properties of the heating process and the manufacturing process can benefit by increasing the speed of the process.

Embodiments of this disclosure especially enhance casting processes in which the part 2 is removed from the mold and immediately subjected to a radiant heat treating process that quickly pushes the part 2 to the solutionizing temperature and then immediately puts the part into a quench.

As an example, heat treating larger aluminum wheels must now contend with relatively thin flange sections of the wheel disk, the relatively thicker sections and the reduced surface areas of the spokes and the dramatically thicker sections of the hub. Additionally, there may be varying desired specifications of the different components for heating rates and terminal temperatures.

Previous to this development, conventional processes for closed-loop control of the heating process did not consider any device or method that could provide such fidelity. An infrared radiant source was not previously available that offered the flexibility, the directivity and the power sufficient to enable such a capability and a new more capable ability to monitor the temperatures of the part being heated with such flexibility and fidelity.

Several embodiments of novel sensor assemblies that address some of the challenges presented by the rapid heating provided by recent developments in heat transfer technologies will now be discussed.

As illustrated in FIGS. 5a and 5b, an embodiment of a contact sensor assembly 40 provides a multi-contact touch point independent of surface roughness that enables a high-quality thermal conductivity path to the part that is lowered onto the sensor. The sensor may use a material such as a beryllium copper mesh or wool 36 that retains its structural integrity or springiness over a broad range of temperatures providing the ability to fit over and around minor surface irregularities and a coiled beryllium copper spring 37 below the mesh pad 36 to provide a significant force to hold the mesh pad 36 against the part 2 during the heating process. In some embodiments, components of the sensory assembly 40 may be made from a steel that retains resilience at the elevated temperatures of a heat treatment process.

The beryllium copper mesh pad 36 and the beryllium copper spring 37 provide a highly conductive thermal energy path to the pure copper spring mount 45 which also acts as the mount for a thermocouple sensor 38.

Figure 4B:
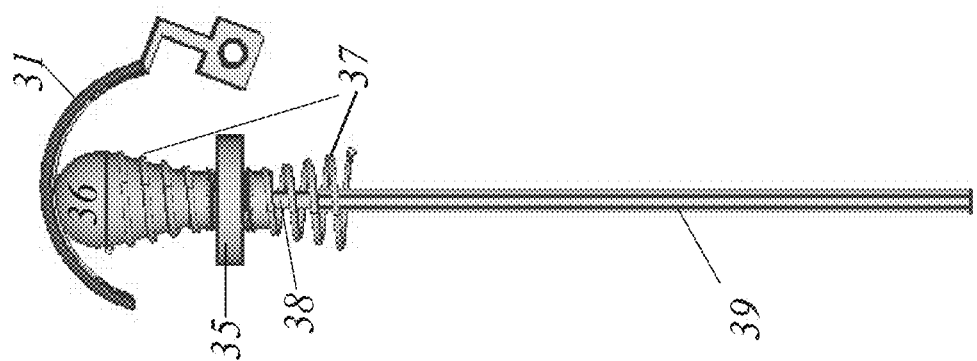
FIG. 4b shows the inner spring structure of the thermocouple structure 30 of FIG. 4a, having the outside ceramic components removed.
Figure 4A:
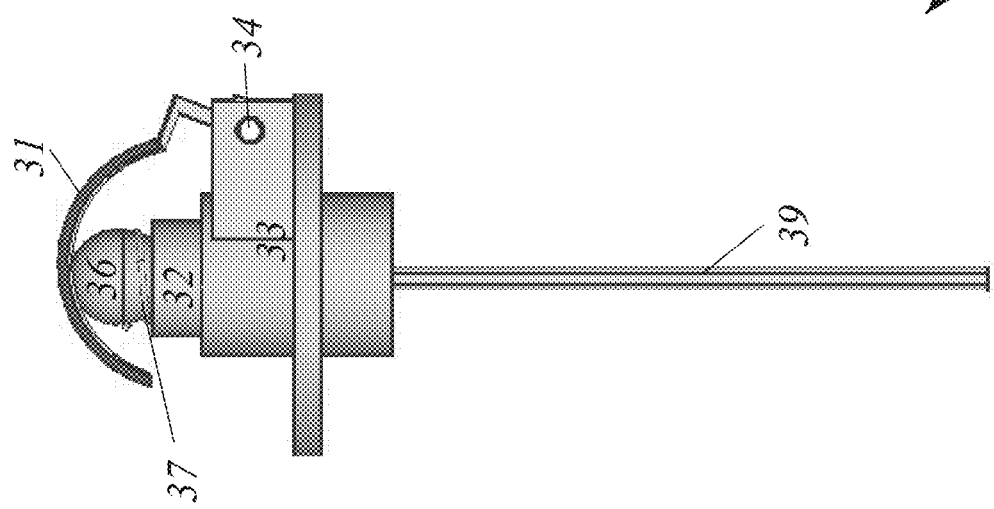
FIG. 4a illustrates one embodiment of a contact thermocouple structure 30 which can be placed within a receiver, for example to measure the temperature at the rim of a wheel casting.

Another embodiment of a contact sensor construct 30, as illustrated in FIGS. 4a and 4b, uses a compound-curved beryllium copper surface spring 31 in a shape similar to a spoon to smooth the fit to the surface of a part 2 that is lowered on an angled path to the sensor 30. In an embodiment, the curved surface spring 31 is disposed against an interior wall of the part as the part 2 is lowered over a sensor that is protruding from a vertical or near vertical wall of the receiver 1. As the part is lowered, the curved spring (spoon) 31 rubs against the wall of the part 2, compressing the beryllium copper mesh pad 36 and the underlying BeCu spring 37.

As an example, if a wheel were the part 2 to be monitored, multiple contact sensors 40 of the exposed mesh type could be located below the hub and each of the spokes, while a plurality of the spoon type sensors 30 could monitor the flange and the rim area of the wheel.

In another embodiment, non-contact sensors 79 are used to measure the temperatures of areas of interest of the casting as shown in FIGS. 7 and 8. Using the example of a wheel as the part 2 to be monitored, a non-contact sensor assembly 70 may comprise a base 71 enclosing one end of an outer housing 72 which mounts a motor 73 and gear 74 for rotating a thermal isolation barrier shutter disk 76 with a positionable aperture 83 which allows thermal energy from the target casting to impinge upon the non-contact sensor 79 within a sensor holder 75. The thermal energy from the part to be measured is revealed to the non-contact sensor 79 through thermal observation holes 81 and 85 in the housing cover plate 78 and end-flow channel plate 77.

The motor 73 moves the thermal isolation barrier shutter disk 76 and positionable aperture 83 components of the non-contact sensor(s) 79 within the holder 75 to a desired position as programmed by a controlling program via commands through an electrical connector for power and signal 88, aligning the aperture 83 with the thermal observation window 85 within the end-flow channel plate 77. The position of the isolation barrier shutter disk 76 and the positionable aperture 83 above the non-contact sensor holder 75 acts as a shield to prevent thermal energy from entering the confines of the non-contact sensor in any position except when the aperture is aligned with the sensor windows in the cover plate 78 and the end-flow channel plate 77 and the sensor(s). The position on the isolation barrier and positionable aperture 83 may be configured for each measurement by aligning the aperture 83 with the thermal observation window 81. This shielding protects the non-contact sensor 79 from "heat soak" or thermal pollution between measurements and allows the cooling system, e.g. internal fluid circuits connected to the air input 86 and output 87 conduits that remove heat before, after and during a measurement of the sensor system to remove heat and prepare the sensor system for the next measurement. The temperature of interest can then be measured and relayed back to the control computer 68 via the electrical connector for power and signal 88.

By using contact and/or non-contact sensors, all areas of a similar type in a part could be managed to have temperatures that are the same as or within a range of one another while making sure that each area of the part is heated to a temperature falling within a range of predetermined temperatures, or a temperature that exceeds a minimum temperature, at scheduled times in the heating process.

The foregoing capability provides new opportunities for most castings, ranging from wheels to engine and suspension components to casings and housings. These capabilities enable the adaptability of low-cost cast parts to be produced with near-forging strengths which enable the use of lighter-weight materials for more applications. Embodiments of the present disclosure may be applied to a variety of castings, such as cast metal parts for the automotive industry, as well as cast parts for all mobile forms of transport, building structure components, building materials, hand tools, industrial equipment, etc. However, embodiments are not limited to heat treatment of castings—any metal part that can be heat treated by an oven system, can be thermally processed according to an embodiment of the present disclosure, including machined and drawn parts.

In this disclosure, the term "Heat Treatment" refers to a variety of processes that use elevated temperatures, including annealing, case hardening, precipitation strengthening (aging or artificial aging), tempering, solutionizing, normalizing and any other thermo-physical process or combination of processes that expose a part to elevated temperatures to affect a change in properties. Embodiments of the present disclosure may be applied to any heat treatment process that applies infrared radiation using one or more of the methods and/or apparatuses of this disclosure for the purpose of altering or affecting the metals chemistry of a solid or semisolid metal, element or compound. While specific embodiments have been illustrated and described herein, it will be appreciated that various changes can be made therein without departing from the scope of this disclosure.

The above description of a process for measuring the temperature of metal alloy castings during heat treatment is provided with reference to the apparatus described above. Practice of the process described herein with other apparatuses for heat treating a metal alloy part is considered to be within the scope of the present disclosure, whether the casting be of aluminum or aluminum alloy, any of the iron alloys (e.g., steel) or copper alloys (e.g., beryllium copper), or any other metal or metal alloy processed in a targeted or directional heat treatment system such as a radiant heat treatment system.

A method of heat treating a part may include providing a part, mounting the part on a casting receiver that blocks most or substantially all reflective paths for radiant energy over one side of the part, activating a plurality of infrared emitters mounted on an interior of a heat treatment oven to direct infrared radiation to an exposed surface of the part, measuring temperature of the part at a plurality of locations using thermal sensor assemblies that are embedded within the casting receiver, and controlling the amount of infrared radiation from the infrared emitters based on the measured temperature. The method may include providing a different amount of infrared energy to different portions of the part so that the different portions receive different heat treatments. In some embodiments, a thermal gradient between the different portions may be at least 10, 20, 50, 100, 200 or 500 degrees Fahrenheit. In an embodiment of heat threating aluminum wheel castings, the potential range of constituent target component temperatures may be between 940° and 960° F. for hub and spoke areas, and 1000° to 1007° F. for the rim area at the end of the process, for example.

A method of heat treating a part may include indexing an orientation of a part using a casting receiver. The heat treatment process may be a stationary process in which the part is stationary when the infrared radiators are activated. The number of infrared heaters within the oven may be more than 5, more than 10, more than 20, or 50, 100, 1000 or more. At least a portion of the infrared heaters may be disposed in sidewalls of a heat treatment chamber, and at least a portion of the infrared heaters may be disposed in a roof or floor of the heat treatment chamber.

A method of heat treating a part may include sealing a lower surface of the part from air flow, and/or shadowing one or more surface of the part from infrared radiation. The shadowing may be provided by covering one or more surface of the part, and closing gaps in the part geometry through which infrared energy could pass. In an embodiment, a casting receiver blocks all openings in an exposed surface of a part and separates the part from a floor of the heat treatment chamber, or other thermally conductive surfaces.

Figure 11:
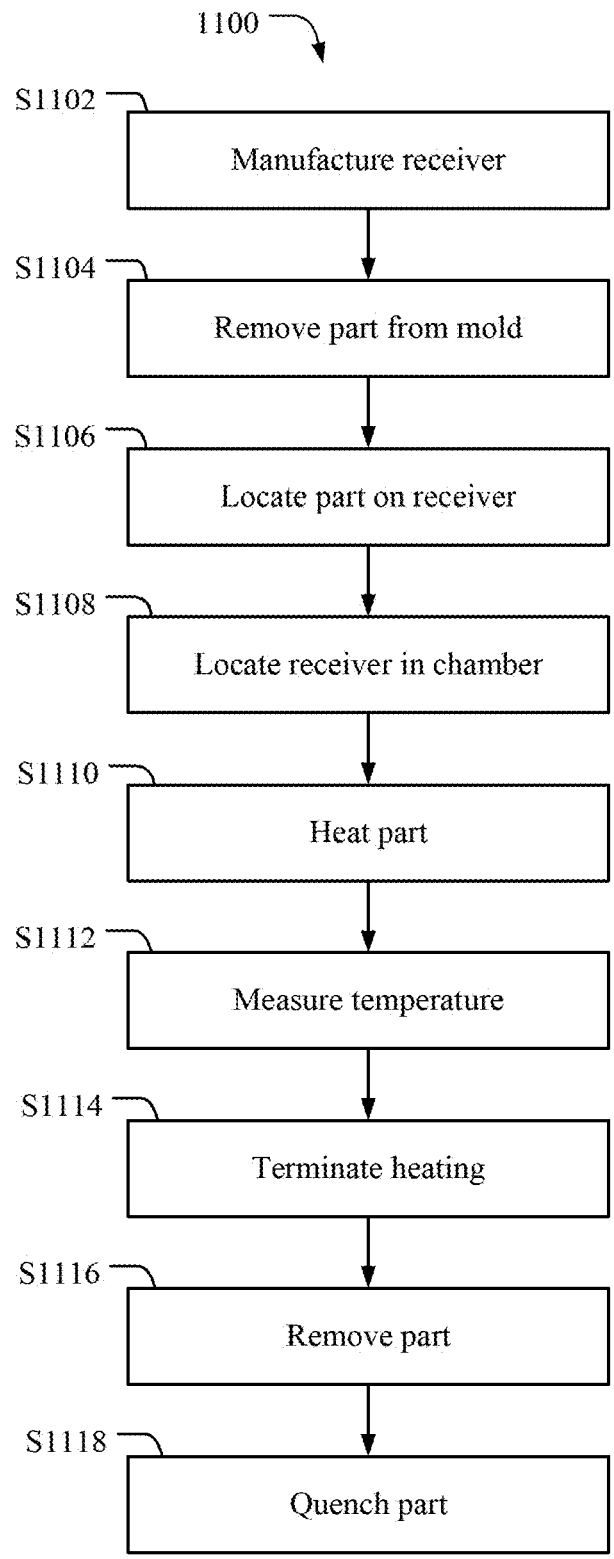
FIG. 11 illustrates an embodiment of a process of heat treating a part.

An embodiment of a process 1100 of heat treating a part 2 will now be described with respect to FIG. 11.

A receiver 1 is manufactured at S1102. A different receiver 1 may be manufactured for each individual part geometry that is heat treated. For example, when heat treating wheels, each type of wheel typically has its own specific geometry including the shape of the rim, wheels and spokes of the wheel. An individual receiver 1 may be manufactured for each wheel, so that the geometry of the receiver exactly matches the geometry of the wheel to maximize the contact area between the receiver 1 and the part 2. In an embodiment, manufacturing the receiver 1 includes machining a refractory material using a machining profile that matches the part geometry, e.g. by using a drawing file of the part to create the machining profile. A receiver may be reused for multiple parts with the same geometry.

When the part 2 is a cast part that is to be heat treated while retaining heat from the casting process, thereby reducing the amount of time and energy of the heat treatment process, the process may initiate by removing the part from a mold at S1104 while the part retains heat from the casting process. In such an embodiment, the remaining steps between removing the part from the mold at S1104 and activating emitters at S1110 may be performed rapidly and efficiently to maximize the amount of heat retained by the casting.

A part 2 is located on a receiver 1 at S1106. In an embodiment, locating the part 2 on the receiver 1 includes bringing one or more contact sensor 30 or 40 into contact with the part. Each contact sensor may be mounted in the receiver 1, and spring-loaded so that the sensor reliably comes into direct contact with a surface of the part when the part is placed on the receiver.

In an embodiment in which a heating profile is being developed for the part 2, at least one contact sensor 7 may be placed within a hole 6 that is present on the surface of the part. The sensor placed within the hole may be placed within the hole before the part is placed on the receiver 1, or may protrude from the receiver so that the sensor extends into the hole 6 when the receiver is mated with the part. In still another embodiment, a sensor may be inserted through a hole in the receiver 1 and into a hole 6 in the part 2 after the part is placed on the receiver. In an embodiment in which holes 6 are drilled into the part, such drilling may be performed before placing the part on the receiver.

Locating the part on the receiver at S1106 may further include blocking convective and radiant pathways around contact and non-contact temperature sensors that are used to measure the temperature of the part 2. Blocking the convective and radiant pathways may include providing portions of the receiver 1 that cover one or more openings between a surface of the part that is exposed to the interior of a heating chamber and a surface of the part that faces the receiver. For example, when the part 2 is a wheel, the receiver may block all the spaces between spokes in the wheel. In such an embodiment, the receiver may prevent infrared radiation from passing through the spaces between spokes, where the energy could otherwise interfere with measurements of a lower surface of the part.

In an embodiment, locating the part on the receiver 1 at S1106 may include providing a friction fit or a seal between the part 2 and the receiver. In an embodiment, the seal may be provided between a portion of the receiver in which a temperature sensor is housed and the receiver. The friction fit or seal may be present when the chamber is heated to the heat treatment temperature.

Accordingly, there may be clearance between the part and the receiver when the part is located on the receiver, and the clearance may close by thermal expansion to create a seal when the components are heated.

In another embodiment, a seal may be created by the force of gravity, e.g. by placing the lower surface of the part on a surface of the receiver 1 that mates with a surface of the part 2. When the surface is a complex three-dimensional profile, the mating surface of the receiver may have a shape that is an inverse of the three-dimensional profile. In an embodiment, the mating surface of the receiver is a mirror-image or relief of the corresponding surface of the part. For example, the part 2 may have one or more protrusion, surface, curve corner, contour or three-dimensional shape, and the mating surface of the receiver 1 may have an inverse of the protrusion, surface, curve, corner, contour or three-dimensional shape, in a similar fashion to how a part mates with a mold.

A temperature sensor in the receiver 1 may be located on the mating surface, so that portions of the receiver surrounding the temperature sensor are in physical contact with the part. In an embodiment, the physical contact extends for a distance of at least one inch, at least two inches, at least four inches, at least six inches, or 10 or 12 or more inches in one or more direction. A larger mating surface reduces the chance that a convective current or radiant emission from within the chamber can affect measurements by the temperature sensors. In an embodiment, the entire space between a lower surface of the part (e.g. a surface that faces the floor of the chamber) and the floor of the chamber is occupied by the receiver, except around spaces to accommodate temperature sensors.

The part 1 is located within the oven chamber at S1108. In various embodiments, locating the part 1 within the oven may include raising the part 1 on the receiver 2 towards the walls and/or the roof which are in a fixed location or lowering the roof or a portion of the roof and/or moving closer walls or a portion of the walls of a chamber to decrease the separation between emitters and a part or an area of a part that is on a receiver 2, placing a receiver on which the part is mounted into a chamber, or placing the part on a receiver that is already disposed within a chamber. In the final case, when the receiver 2 is already located within the chamber when the part is placed on the receiver, this step is concurrent with locating the part on the receiver at S1106.

In an embodiment, the receiver 1 may interface with an object such as a piece of refractory material that is configured to retain the receiver in a specific location, and in a specific orientation with respect to emitters 100 within the chamber. In another embodiment, the receiver is affixed to the base of the chamber to ensure that each part 1 placed on the receiver 2 has the same orientation.

The part 1 is heated at S1110 to perform heat treatment on the part. Heating the chamber may include delivering power to infrared emitters 100 mounted on a side or roof of the oven chamber. Power may be delivered independently sequentially or in parallel, in various individually controlled amounts to a plurality of coils associated with infrared emitters 100, and the heating coils may have different densities, exposures and orientations with respect to a refractory material in which they are embedded.

For example, a first portion of coils 92 may have a portion that is exposed above the refractory material 91 by a first distance, a second portion of the coils 93 may have a portion that is exposed above refractory material 91 by a second distance, and a third portion of the resistive coils 94 may have a portion that is exposed above refractory material 91 by a third distance, as illustrated in FIGS. 9a-9c. The second distance may be greater than the first distance, and the third distance may be greater than the second distance. When power is delivered to the first, second and third coils, the coils may be heated to corresponding first, second and third temperatures, where the first temperature is the highest temperature, and the third temperature is the lowest temperature.

In an embodiment, emitters 100 with different coil depths are disposed in different locations within the oven chamber to deliver different amounts of infrared energy to corresponding areas of a part 1, so that the different areas of the part are heated to different temperatures, and/or heated at a different rate.

Similarly, heating the part 1 at S1110 may include simultaneously delivering energy to coils that are arranged to have different densities with respect to a surface of the emitters. As seen in FIGS. 10a-10d, the different densities may be achieved by changing the spacing between adjacent turns of a coil, or spacing between adjacent coils in an emitter. Such variations affect the energy density provided by the emitters, which in turn may affect the ultimate temperature reached by a portion of a part and the rate at which the part is heated. Accordingly, different portions of the part may be heated at different rates and/or heated to different temperatures at S1110 by delivering energy to a plurality of radiant emitters having different coil configurations.

Temperature measurements are performed at S1112. Performing temperature measurements may include measuring the part 2 using at least one contact temperature sensor 30 or 40 and/or at least one non-contact temperature sensor. The non-contact temperature sensor may be associated with an assembly 70. In such an embodiment, measuring temperature at S1112 may include engaging motor 73 to rotate a shutter 76 so that one or more non-contact thermal sensor 79 moves from a blocked orientation in which an optical path to the part is blocked to an exposed orientation in which the optical path to the part is open, and the temperature sensor is exposed to the part.

The temperature measurement may be taken when the path is opened, after which the shutter 76 is moved again to block the optical path and thermal energy heating of the sensor. In an embodiment, the exposure time may be less than 5 seconds, less than one second, or less than one half, one quarter or one tenth of a second. Shorter exposure times reduce the amount of thermal pollution introduced into the assembly 70. In an embodiment, heat is removed from the assembly between measurements by, for example, a heat removing fluid such as a liquid or gas through flow intake/ output 86/87 openings. Heat removal may be performed to provide a stable temperature within the assembly 70.

The temperature measurements performed at S1112 may be used to control the amount of heat delivered to a part 1 at S1110. For example, a controller 68 may be programmed to modify the amount of energy delivered to one or more of the radiant emitters 100 within the chamber to ensure that each area of the part is heated to within a predetermine temperature range at predetermined times. The combination of predetermined temperatures and times may be referred to as a temperature profile, and the temperature profile may have been developed by measuring temperatures within the part as discussed above.

After the part has been exposed to a temperature profile, heating is terminated at S1114 and the part is removed from the chamber and the receiver at S1116 and cooled to room temperature.

When the desired heat treatment condition of a part 1 includes a step of quenching, quenching is performed at S1118. The part may be quenched by a liquid bath or by exposing the part to a stream of gas. In some embodiments, the part is exposed to the stream of gas before removing the part from the receiver and/or the chamber, in which case quenching at S1118 is initiated before removing the part at S1116. In an embodiment the part is removed from the receiver and immediately placed into a temperature-controlled fluid quench to rapidly remove thermal energy from the part until reaching an operational temperature, which may be room temperature.

In an embodiment, a plurality of infrared emitters comprises: a first emitter including a first set of coils; and a second infrared emitter including a second set of coils, wherein a spacing of the first set of coils is different from a spacing of the second set of coils. In an embodiment, the spacing is a spacing between centers of adjacent wire turns within a row of coils. In an embodiment, the spacing is a spacing between adjacent exposed edges of rows of coils.

A plurality of infrared emitters may comprise: a first emitter with a first set of resistive coils embedded in a refractory material; and a second emitter with a second set of resistive coils buried in the refractory material, wherein the first set of resistive coils extend a first distance above refractory material, the second set of resistive coils extend above the refractory material by a second distance, and the first distance is different from the second distance. The receiver may have a conical protrusion that supports a corresponding surface of the part.

In an embodiment, radiant emitters within a chamber are configured to heat two different portions of the part at two different rates, or to heat two different portions of the part to two different temperatures. A receiver may be configured to support part at two different heights, or to support multiple surfaces of a part at multiple heights.

Heat treating a part may include heating a first portion of the part to a first temperature, heating a second portion of the part to a second temperature different from the first temperature, thereby providing different properties to the first portion and the second portion by the heat treatment process.

An oven for heat treating a part may include: a plurality of infrared emitters including respective resistive coils embedded in a refractory material, the plurality of infrared emitters including: a first emitter with a first set of resistive coils; and a second infrared emitter with a second set of resistive coils, wherein a spacing of the first set of resistive coils is different from a spacing of the second set of resistive coils.

The invention claimed is:

1. A system for heat treating a part with a first surface on one side of the part and a second surface on an opposite side of the part, the system comprising:
   an oven chamber with a plurality of infrared emitters configured to direct infrared energy towards the first surface of the part; and
   a receiver with an outer surface configured to contact the second surface of the part, the receiver including a temperature sensor,
   wherein the receiver is configured to block the entire second surface of the part from infrared energy radiated from the infrared emitters and convective currents within the chamber.

2. The system of claim 1, wherein the receiver is configured to shield the temperature sensor from direct infrared emissions from the infrared emitters and reflections from the infrared emissions.

3. The system of claim 1, wherein a portion of the receiver that contacts the second surface of the part is a physical inverse of the second surface of the part in three dimensions.

4. The system of claim 1, wherein the part has a plurality of openings between the first surface of the part and the second surface of the part, and the receiver is configured to block the infrared energy and the convective currents from passing through the openings.

5. The system of claim 1, wherein the plurality of infrared emitters comprises:
   a first set of infrared emitters disposed in a roof of the oven chamber and configured to radiate infrared energy onto the first surface of the part; and
   a second set of infrared emitters disposed in a side of the oven chamber and configured to radiate infrared energy onto a side surface of the part.

6. The system of claim 1, wherein the temperature sensor is a spring-loaded contact temperature sensor that extends from a surface of the receiver when no part is present on the receiver, and is configured to compress and contact the part when the part is placed on the receiver.

7. The system of claim 1, wherein the temperature sensor is a non-contact temperature sensor in an assembly comprising the non-contact temperature sensor, a window and a motor, and the motor is configured to move the window from a first position to a second position to expose the part to the non-contact temperature sensor, and configured to move the window back to the first position to block the part from the non-contact temperature sensor when the non-contact temperature sensor is not sensing a temperature of the part.

8. The system of claim 1, wherein the receiver is configured to physically support the part against the force of gravity when the part is placed on the receiver.

9. The system of claim 8, wherein the part is a cast aluminum wheel for a vehicle, and the second surface of the part is one side of the wheel.

10. The system of claim 1, wherein the infrared emitters are configured to heat the part to a temperature of at least 900° F.

11. A method for heat treating a part, the method comprising:
   locating the part on a receiver so that a downward-facing surface of the part is covered by an upper surface of the receiver;
   providing energy to a plurality of infrared emitters configured to direct infrared energy towards the part and disposed in an oven chamber,
   wherein the receiver shadows the entire downward-facing surface of the part from infrared energy reflected off walls of the chamber.

12. The method of claim 11, wherein the receiver is configured to shield a temperature sensor within the receiver from direct infrared emissions from the infrared emitters and reflections from the infrared emissions.

13. The method of claim 11, wherein providing energy to the plurality of infrared emitters includes heating a first portion of the part to a first temperature and heating a second portion of the part to a second temperature different from the first temperature.

14. The method of claim 11, wherein the part has at least one opening between the downward-facing surface and an opposing surface, and locating the part on the receiver includes blocking the at least one opening by the receiver.

15. The method of claim 11, further comprising measuring a temperature of the part by a spring-loaded contact temperature sensor that extends from a surface of the receiver when no part is present on the receiver, and is configured to compress and contact the part when the part is placed on the receiver.

16. The method of claim 11, further comprising measuring a temperature of the part by:
- activating a motor of a non-contact temperature sensor assembly to move a window in the assembly from a first position to a second position to expose the part to a non-contact temperature sensor;
- measuring the temperature while the window is in the second position; and
- activating the motor to move the window back to the first position.

17. The method of claim 11, wherein the part is a cast aluminum part.

18. The method of claim 17, wherein the cast aluminum part is a wheel for a vehicle.

19. The method of claim 11, wherein the heat treatment is annealing, case hardening, precipitation strengthening, tempering, solutionizing, or normalizing.

20. The system of claim 10, wherein the infrared emitters are directional infrared emitters.

* * * * *